(12) United States Patent
Kato

(10) Patent No.: US 7,920,742 B2
(45) Date of Patent: Apr. 5, 2011

(54) IMAGE PROCESSING APPARATUS, PROGRAM AND RECORDING MEDIUM FOR DOCUMENT REGISTRATION

(75) Inventor: Masahiro Kato, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1002 days.

(21) Appl. No.: 11/495,635

(22) Filed: Jul. 31, 2006

(65) Prior Publication Data

US 2007/0206883 A1 Sep. 6, 2007

(30) Foreign Application Priority Data

Mar. 6, 2006 (JP) ................................. 2006-058997

(51) Int. Cl.
G06K 9/34 (2006.01)
G06K 9/66 (2006.01)

(52) U.S. Cl. ........................................ 382/195; 382/176

(58) Field of Classification Search .......... 382/137–140, 382/176, 178, 182, 190, 199, 195, 186
See application file for complete search history.

(56) References Cited

U.S. PATENT DOCUMENTS

| | | | | |
|---|---|---|---|---|
| 5,313,527 A * | 5/1994 | Guberman et al. | ........... | 382/186 |
| 5,359,667 A * | 10/1994 | Borowski et al. | ............. | 382/138 |
| 5,467,407 A * | 11/1995 | Guberman et al. | ........... | 382/186 |
| 5,751,842 A * | 5/1998 | Riach et al. | .................... | 382/137 |
| 5,850,480 A * | 12/1998 | Scanlon | ........................ | 382/229 |
| 5,854,853 A * | 12/1998 | Wang | ........................... | 382/176 |
| 5,917,931 A * | 6/1999 | Kunkler | ......................... | 382/137 |
| 6,011,877 A * | 1/2000 | Ishikawa et al. | .............. | 382/290 |
| 6,246,794 B1 * | 6/2001 | Kagehiro et al. | ............. | 382/185 |
| 6,563,949 B1 * | 5/2003 | Takebe | .......................... | 382/190 |
| 6,683,983 B1 * | 1/2004 | Shen et al. | ..................... | 382/168 |
| 6,731,413 B1 * | 5/2004 | Nakazawa et al. | ............ | 358/502 |
| 6,845,366 B1 * | 1/2005 | Hassanein et al. | .............. | 705/45 |
| 6,917,720 B1 * | 7/2005 | Caesar et al. | ................. | 382/287 |
| 6,941,030 B2 * | 9/2005 | Kakutani et al. | ............. | 382/290 |
| 7,020,320 B2 * | 3/2006 | Filatov | .......................... | 382/137 |
| 7,359,568 B2 * | 4/2008 | Dobashi | ........................ | 382/266 |
| 7,657,091 B2 * | 2/2010 | Postnikov et al. | ............ | 382/178 |
| 2001/0029513 A1 * | 10/2001 | Kuwano et al. | ................ | 707/522 |
| 2002/0064308 A1 * | 5/2002 | Altman et al. | ................ | 382/187 |
| 2002/0105673 A1 * | 8/2002 | Kurashina | ..................... | 358/1.15 |
| 2002/0126904 A1 * | 9/2002 | Kakutani et al. | .............. | 382/229 |
| 2002/0161710 A1 * | 10/2002 | Furukawa | ........................ | 705/51 |
| 2002/0175958 A1 * | 11/2002 | Natori | ................................ | 347/5 |
| 2003/0016870 A1 * | 1/2003 | Waida et al. | .................. | 382/218 |
| 2003/0021460 A1 * | 1/2003 | Kelland | ......................... | 382/137 |

(Continued)

FOREIGN PATENT DOCUMENTS

JP A-5-233705 9/1993

(Continued)

*Primary Examiner* — Jingge Wu
*Assistant Examiner* — Mia M Thomas
(74) *Attorney, Agent, or Firm* — Oliff & Berridge, PLC

(57) ABSTRACT

An image processing apparatus includes a document input unit that inputs document data of a document, a first identifying unit that identifies a position of a string included in the document, a second identifying unit that identifies a range of a mark given in the document based on an orientation of the string, and a string extracting unit that extracts a string subject to the mark, based on the position of the string identified by the first identifying unit and the range of the mark identified by the second identifying unit.

13 Claims, 3 Drawing Sheets

U.S. PATENT DOCUMENTS

| | | | |
|---|---|---|---|
| 2003/0053699 A1* | 3/2003 | Olsson | 382/228 |
| 2003/0101177 A1* | 5/2003 | Matsubayashi et al. | 707/6 |
| 2003/0115470 A1* | 6/2003 | Cousins et al. | 713/179 |
| 2003/0169924 A1* | 9/2003 | Nishiyama et al. | 382/182 |
| 2003/0174866 A1* | 9/2003 | Poynter | 382/114 |
| 2004/0193627 A1* | 9/2004 | Matsuda | 707/100 |
| 2004/0264793 A1* | 12/2004 | Okubo | 382/243 |
| 2005/0047641 A1* | 3/2005 | Volpa | 382/137 |
| 2005/0243370 A1* | 11/2005 | Imai et al. | 358/1.18 |
| 2005/0259872 A1* | 11/2005 | Honma | 382/182 |
| 2006/0008148 A1* | 1/2006 | Mochizuki | 382/182 |
| 2006/0098874 A1* | 5/2006 | Lev | 382/182 |
| 2006/0101004 A1* | 5/2006 | Matsubayashi et al. | 707/3 |
| 2006/0126095 A1* | 6/2006 | Tamura et al. | 358/1.14 |
| 2006/0289625 A1* | 12/2006 | Tamune | 235/375 |
| 2007/0110311 A1* | 5/2007 | Houle et al. | 382/186 |
| 2007/0206024 A1* | 9/2007 | Rao | 345/593 |
| 2007/0206883 A1* | 9/2007 | Kato | 382/305 |
| 2007/0274704 A1* | 11/2007 | Nakajima et al. | 396/310 |

FOREIGN PATENT DOCUMENTS

| | | |
|---|---|---|
| JP | A-2002-189984 | 7/2002 |
| JP | A-2005-235099 | 9/2005 |

* cited by examiner

*FIG. 2*
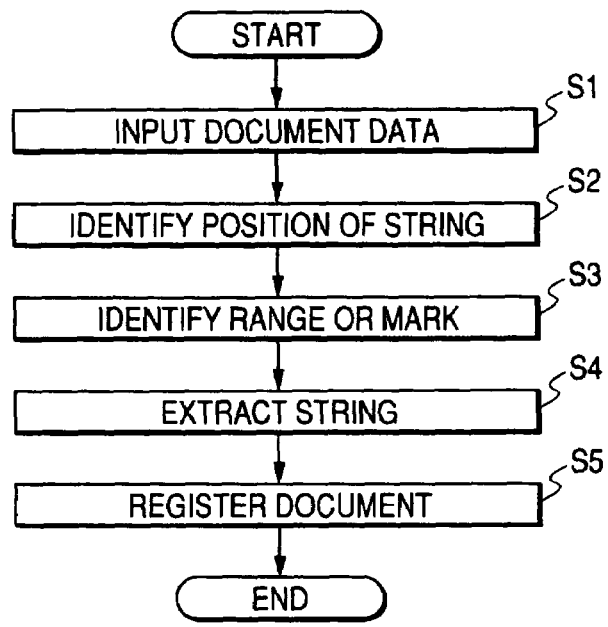
*FIG. 3*
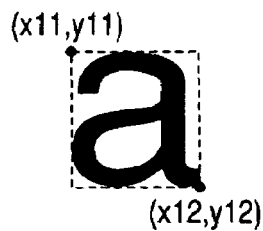
*FIG. 4*
familiar with the task in advance in order to register a document having an image file
DIVIDE INTO WORDS
"familiar" "with" "the" "task" "in" "advance" "in" "order" "to" "register" "a" "document" "having" "an" "image" "file"

IMAGE PROCESSING APPARATUS, PROGRAM AND RECORDING MEDIUM FOR DOCUMENT REGISTRATION

BACKGROUND (1) Technical Field

The invention relates to an image processing apparatus and recording medium recording an image processing program, which may be used for electronifying and filing a document.

(2) Related Art

In recent years, a document printed on a paper medium (paper document) is often scanned by a scanner and is electronified to document data, and the document data may be stored in a hard disk, for example, to use. In order to increase the usability of the stored document, some attribute information is generally given to each document data. The typical examples of the attribute information may include a keyword for document search. A user may input a desired keyword through a keyboard in storing document data to register the keyword functioning as attribute information. However, inputting keywords through a keyboard may become burdensome for the user when a large amount of document data has to be handled since the number of keywords to be registered is increased therefor.
Unit

SUMMARY

According to an aspect of the invention, there is provided an image processing apparatus includes a document input unit that inputs document data of a document, a first identifying unit that identifies a position of a string included in the document, a second identifying unit that identifies a range of a mark given in the document based on an orientation of the string, and a string extracting unit that extracts a string subject to the mark, based on the position of the string identified by the first identifying unit and the range of the mark identified by the second identifying unit.

BRIEF DESCRIPTION OF THE DRAWINGS

Exemplary embodiments of the invention will be described in detail based on the following figures, wherein:

FIG. 2 is a flowchart showing an image processing method according to an exemplary embodiment of the invention;

FIG. 3 is a diagram describing processing of detecting the position of a character;

FIG. 4 is a diagram showing an example in which a string is divided into words;

DETAILED DESCRIPTION

Specific exemplary embodiments of the invention will be described in detail below with reference to drawings.

Figure 1:
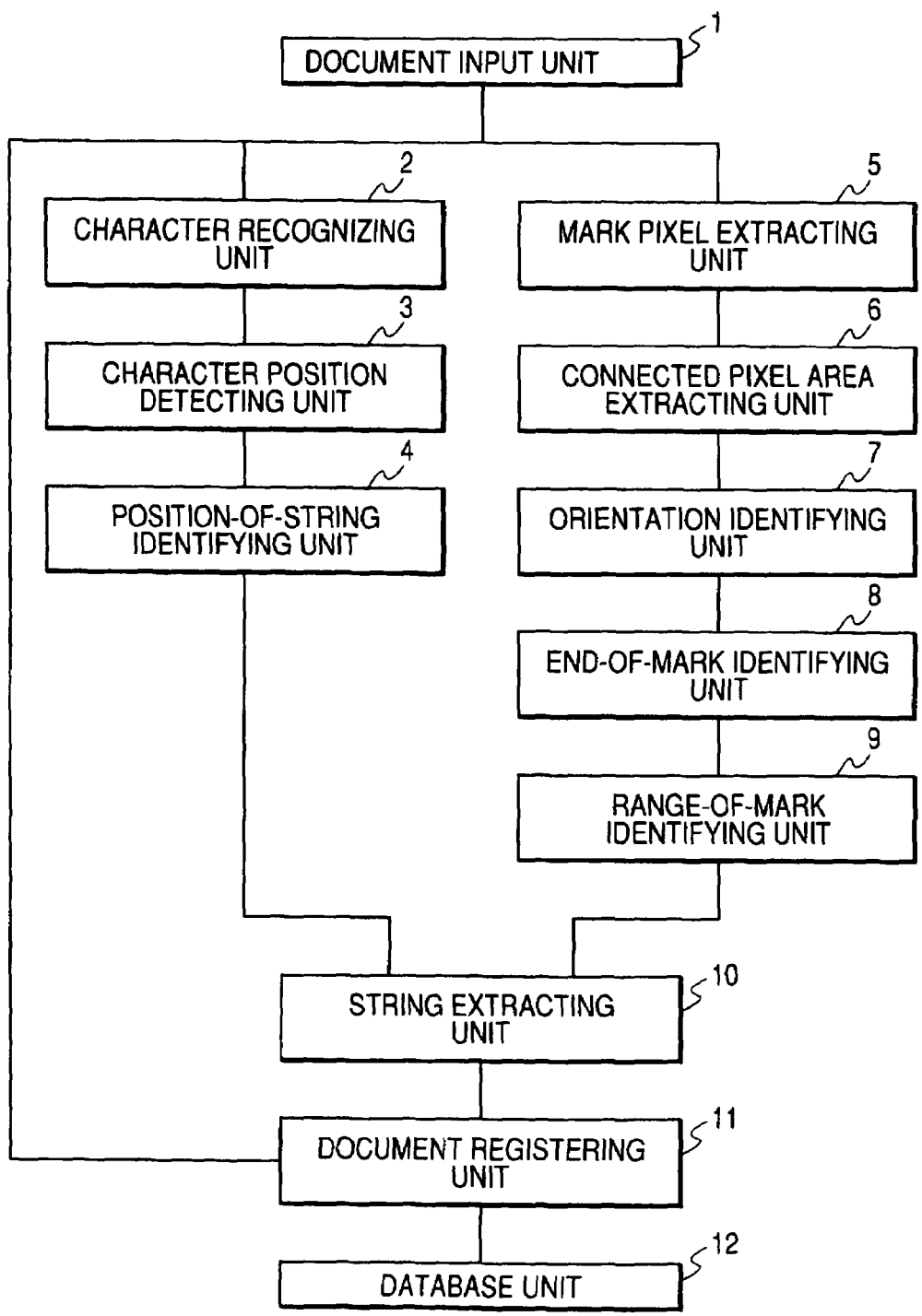
FIG. 1 is a block diagram showing a construction example of an image processing apparatus according to an exemplary embodiment of the invention.

FIG. 1 is a block diagram showing a construction example of an image processing apparatus according to an exemplary embodiment of the invention. In FIG. 1, a document input unit 1 inputs electronified document data in the bitmap format. The document input unit 1 may include, for example, an image scanner that optically scans an image on a paper document and converts (electronifies) the scanned image to document data or an input interface that captures document data output from an image scanner via a cable, for example.

Here, it is assumed that the original paper document of the document dataunit includes a marked part. The marking is performed by filling in the string to be registered as attribute information in the document with a highlighter or a line marker, for example, which self-contains translucent fluorescent ink. Variety of color may be adopted as the color of the fluorescent ink, such as yellow, light blue, pink, orange, yellow green, blue, red and green. Any color may be applied for the marking as far as the paper document is printed in black and white, but light color (such as yellow, light blue and pink) may be better to use than dark color in consideration of the readability of characters. For a document printed in color, a different color from the color expressed on the paper in color print may be adopted to mark.

A character recognizing unit 2 uses document data input from the document input unit 1 to recognize a character included in the document data. A character position detecting unit 3 detects the position of the character recognized by the character recognizing unit 2. A position-of-string identifying unit 4 divides text represented in characters recognized by the character recognizing unit 2 into strings in words and identifies the position of each of the strings based on the position information of the character detected by the character position detecting unit 3.

A mark pixel extracting unit 5 extracts pixels representing a mark (which may be called "mark pixel" hereinafter) given in the document of the document data input from the document input unit 1. Color information of a pixel to be extracted is defined in the mark pixel extracting unit 5 in accordance with the color of the mark given in a document. For example, when the color of the fluorescent ink used for marking is yellow, the color information of the pixel to be extracted is defined therein by the color information in accordance with yellow of the fluorescent ink. When multiple colors are used to mark in a document, the mark colors are defined as color information of pixels to be extracted, and each of the mark color and the attribute information upon registration of the document may be mapped. For example, when yellow, pink and light blue are mark colors, the correspondences are defined between the strings marked with the colors and the types of attribute information (such as a keyword for document search, the file name of a document, a created date and a creator).

A connected pixel area extracting unit 6 determines mutually linked mark pixels as "connected pixels" among mark pixels extracted by the mark pixel extracting unit 5 and extracts a pixel area occupied by multiple (or many) connected pixels belonging to one link group as a connected pixel area. An orientation identifying unit 7 identifies the orientation of the mark given in a document. An end-of-mark identifying unit 8 identifies the beginning and end of a mark based on the orientation of the mark identified by the orientation identifying unit 7 and a range of the connected pixel area extracted by the connected pixel area extracting unit 6. A range-of-mark identifying unit 9 identifies a range of a mark by the orientation of a string based on the beginning and end of the mark identified by the end-of-mark identifying unit 8.

A string extracting unit 10 extracts a string subject to marking based on the position of the string identified by the position-of-string identifying unit 4 and the range of the mark identified by the range-of-mark identifying unit 9. A document registering unit 11 registers a document data input from the document input unit 1 with a database unit 12 and registers the string extracted by the string extracting unit 10 with the database unit 12 as attribute information of the document data in registering the document data. The database unit 12 may be a large capacity data storage device such as a hard disk.

The character recognizing unit 2, character position detecting unit 3 and position-of-string identifying unit 4 of the components are included in a "first identifying unit" in an aspect of the invention, that is, a unit that identifies the position of the string included in a document by using document data input by the document input unit 1. The mark pixel extracting unit 5, connected pixel area extracting unit 6, orientation identifying unit 7, end-of-mark identifying unit 8 and range-of-mark identifying unit 9 are included in a "second identifying unit" in an aspect of the invention, that is, a unit that identifies the range of a mark given in a document by the orientation of the string by using document data input by the document input unit 1.

Next, an image processing method applying the image processing apparatus according to this exemplary embodiment of the invention will be described with reference to the flowchart in FIG. 2. The image processing method is implemented by a CPU (central processing unit) by invoking and executing an image processing program stored in a ROM (Read-Only Memory) or hard disk, for example, to a RAM (Random Access Memory). The image processing program may be installed in an image processing apparatus in advance or may be stored and provided in a computer-readable medium such as a CD-ROM, an MO and a DVD. Alternatively, the image processing program may be provided over a communication network in a wired or wireless manner without using a recording medium.

First, document data is input from the document input unit 1 (step S1). The document data may be input by capturing the document data resulting from an optical scanning of an image on a paper document marked in advance. Next, the document data input by a proceeding step is used to perform a processing of locating the string included in the document (step S2) and a processing of identifying a range of the mark given in the document (step S3). The processing in step S2 and the processing in step S3 may be performed in any order or may be performed simultaneously in parallel.

The processing of locating a string (step S2) is performed by the character recognizing unit 2, character position detecting unit 3 and position-of-string identifying unit 4 included in the first identifying unit. In this case, the character recognizing unit 2 recognizes each of characters included in a document by using a publicly-known character recognizing technology (such as OCR processing) and converts each of the recognized characters to text code. The character position detecting unit 3 detects the position of each character included in a document by coordinate data. For example, as shown in FIG. 3, when the character converted to text code by the character recognizing unit 2 is "a", the coordinate data (x11,y11)-(x12,y12) indicating the position of the rectangular area circumscribing the character is detected as the position information of the character.

Figure 5:
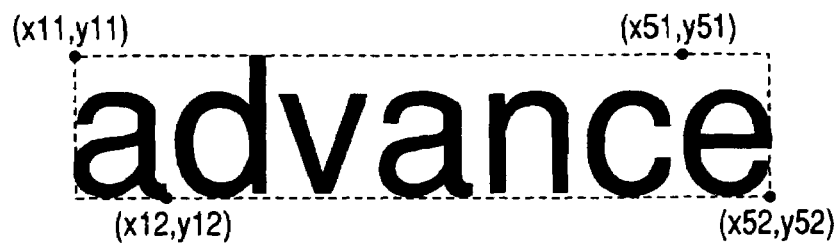
FIG. 5 is a diagram describing processing of locating a string.

The position-of-string identifying unit 4 performs morphological analysis on each character converted to text code by the character recognizing unit 2, whereby the string included in the document is divided into words, and the position of the string represented by each word is identified by using the coordinate data detected by the character position detecting unit 3. For example, as shown in FIG. 4, the string, "familiar with the task in advance in order to register a document having an image file" may be divided into words, "familiar" "with" "the" "task" "in" "advance" "in" "order" "to" "register" "a" "document" "having" "an" "image" "file". The position of the string including words including multiple characters such as "advance" may be identified by the coordinate data (x11,y11)-(x52,y52) of the corner based on the coordinate data (x11,y11)-(x12,y12) of the character, "a", at the beginning of the string and the coordinate data (x51,y51)-(x52,y52) of the character "e" at the end as shown in FIG. 5.

On the other hand, the processing of identifying the range of the mark (step S3) is performed by the mark pixel extracting unit 5, connected pixel area extracting unit 6, orientation identifying unit 7, end-of-mark identifying unit 8 and range-of-mark identifying unit 9, which are included in the second identifying unit. The mark pixel extracting unit 5 extracts a pixel having a pixel value matching with predefined color information as a mark pixel. For example, when the color information of a pixel to be extracted by the mark pixel extracting unit 5 is defined for a yellow florescent ink, the pixel having the pixel value matching with the yellow fluorescent ink is extracted as a mark pixel.

The connected pixel area extracting unit 6 determines mutually linked mark pixels as connected pixels among the mark pixels extracted by the mark pixel extracting unit 5 and extracts the pixel area occupied by multiple connected pixels belonging to one link group as a connected pixel area. Whether given mark pixels are linked or not may be determined as follows, for example. That is, a window in a predetermined size (m×n pixel size) is defined with one mark pixel (focus pixel) at the center, and, if another mark pixel having the same color as that of the focus pixel exists within the window, the two mark pixels are determined to be connected pixels. Thus, the pixels virtually indicating the mark in one line are all determined as connected pixels belonging to one link group. When multiple parts are marked in a document, connected pixel areas, the number of which is equal to the number of the marks, are extracted.

The orientation identifying unit 7 identifies the orientation of the mark given in a document. Generally, the orientation of the mark follows the orientation of characters in a document. For example, since characters are aligned horizontally in a document in horizontal line orientations, marking is given thereover horizontally. Since characters are aligned vertically in a document in vertical line orientations, marking is given thereover vertically. In a document in horizontal line orientations, the orientation of multiple characters included in a word is horizontal while the orientation of multiple characters included in a word is vertical in a document in vertical line orientations. Then, the orientation identifying unit 7 identifies the orientation of multiple characters included in a word resulting from the division of a string by the position-of-string identifying unit 4 as the orientation of the marking. Alternatively, the pixels belonging to one group, which is determined as connected pixels by the connected pixel determining unit 5, may be enclosed with a rectangular area circumscribing the pixels, and the longitudinal orientation of the rectangular area may be identified as the orientation of the mark.

Figure 6:
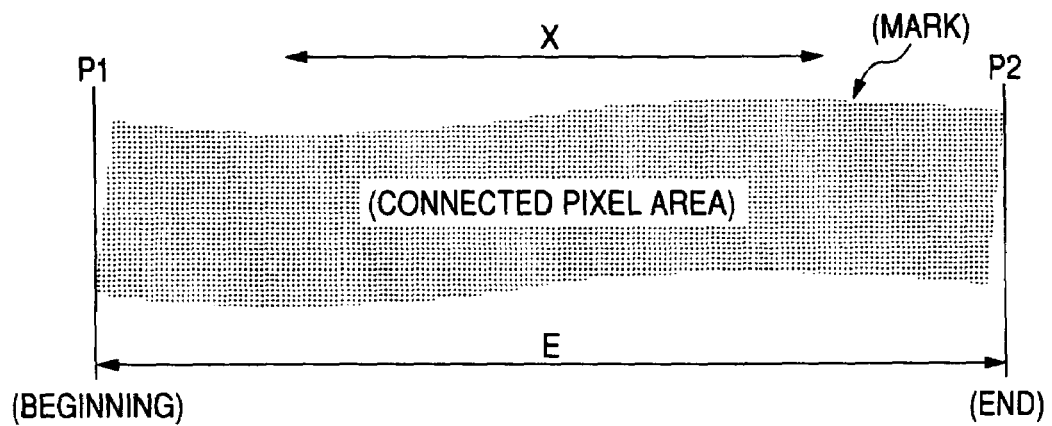
FIG. 6 is a diagram describing the processing of identifying the range of a mark.

The end-of-mark identifying unit 8 identifies one end and the other end of the connected pixel area, which is extracted by the connected pixel area extracting unit 6, along the orientation of the mark identified by the orientation identifying unit 7 as the beginning and end of the mark. For example, as shown in FIG. 6, when the orientation of the mark identified by the orientation identifying unit 7 is an orientation X, one end P1 and the other end P2 of the connected pixel area, which are extracted by the connected pixel area extracting unit 6, in the orientation X are identified as the beginning and end of the mark.

Figure 7:
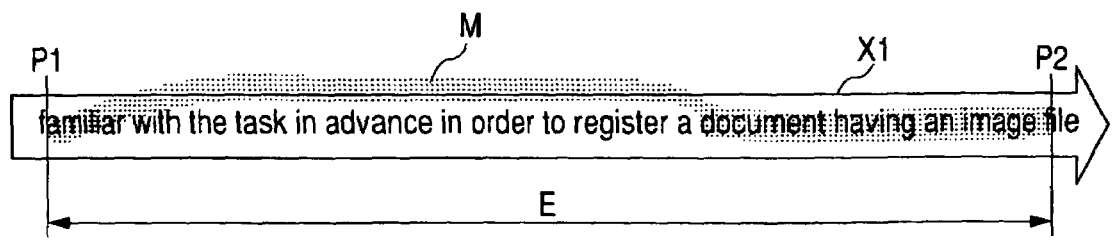
FIG. 7 is a diagram showing the range of the mark identified by the orientation of a string.

The range-of-mark identifying unit 9 identifies the beginning and end of the range that a given mark covers in the orientation of the string (that is, the area where characters are actually aligned) based on the beginning P1 and end P2 of the mark, which are identified by the end-of-mark identifying unit 8. For example, as shown in FIG. 7, when the string with a mark M thereover is provided along an orientation X1 in a document, the range from the beginning P1 to the end P2 of the mark M is identified in the orientation X1 of the arrangement of the string (arrangement area) as a range E of the mark. In other words, even when the mark M curves in the middle, the curve is neglected, and the range E of the mark is identified by the area (row/column) where the string is actually provided.

In this way, even when a position of a mark given by a user in a document is off a position that the user intends in the middle of the mark, the identification of the range E of the mark by the orientation X1 of a string allows the proper identification of the range of the mark that the user intends by neglecting the deviation. Thus, even when a character is off the mark M in the middle of the mark M, the range including the character can be identified as the range E of the mark. Furthermore, the beginning and end of the mark range that the user intends can be properly identified by identifying the orientation of the mark M between vertical and horizontal line orientations and identifying one end and the other end of the connected pixel area along the orientation of the mark as the beginning P1 and end P2 of the mark, respectively.

Next, the string extracting unit 10 extracts the string subject to the marking based on the position of the string identified by the position-of-string identifying unit 4 and the range of the mark identified by the range-of-mark identifying unit 9. More specifically, the string included in the range of the mark identified by the range-of-mark identifying unit 9 is extracted as the string subject to the marking from strings, the positions of which are identified by the position-of-string identifying unit 4 (step S4). For example, as shown in FIG. 7, when the range E of a mark is identified by the orientation X1 of a string, the string included in the range E of the mark is extracted as the string subject to the marking. The string included in the range of a mark refers to the string, at least a part of which overlaps the range of the mark.

Here, the beginning P1 of the mark M is positioned at the middle of the given string representing the given word, "familiar", while the end P2 of the mark M is positioned at the middle of the given string representing the given word, "file". In this case, the string extracting unit 10 determines whether the string is to be extracted as the "string subject to the marking" or not, based on a predefined extraction condition.

The extraction condition may be based on the ratio between the part that the given string, such as "familiar" and "file", overlaps the range E of the mark identified by the range-of-mark identifying unit 9 and the part that the given string does not overlap the range E of the mark. In this case, the position of the string identified by the position-of-string identifying unit 4 is superimposed over the range E of the mark identified by the range-of-mark identifying unit 9, and the part of the string overlapping the range E of the mark and the part of the string not overlapping the range E of the mark are then determined. If the given string overlaps the half or more than half of the range E of the mark, the string may be extracted as "the string subject to the marking", and the other part may not be extracted.

Under the extraction condition, in the string, "familiar", the part overlapping the range E of the mark (the character part, "amiliar") has a higher ratio than the part not overlapping the range E of the mark (the character part, "f"). Therefore, the string extracting unit 10 extracts the given string, "familiar", as "the string subject to the marking". On the other hand, in the string, "file", the part overlapping the range E of the mark (the character part, "f") has a lower ratio than the part not overlapping the range E of the mark (the character part, "ile"). Therefore, the string extracting unit 10 does not extract the given string, "file", as "the string subject to the marking".

As a result, the string extracting unit 10 extracts the strings that the user intends to mark, that is, the strings, "familiar with the task in advance in order to register a document having an image". Notably, in related art, the strings, "amiliar" and "document having an image f" are extracted since the marked part is subject to OCR processing.

Another alternative extraction condition may be based on the type of the word represented by a given string. For example, the types of word maybe divided into independent words (including nouns and verbs) and dependent words (including article), and the given string may be extracted as the string subject to the marking if the type of the word represented by the string is an independent word while the given string may not be extracted if the type of the word represented by the string is a dependent word. The exemplified two extraction conditions may be adopted separately or in combination. Alternatively, different extraction conditions may be defined between the beginning P1 and end P2 of the mark identified by the end-of-mark identifying unit 8.

The determination of the extraction of a string based on a predefined extraction condition allows proper extraction of the string that a user intends even when the end of the mark given in a document by the user is off the position that the user intends.

Subsequently, the document registering unit 11 registers the document data input from the document input unit 1 with the database unit 12 and registers the string extracted by the string extracting unit 10 with the database unit 12 as attribute information of the document data at the time of the registration of the document data (step S5). In this case, the document data and attribute information are mutually brought into correspondence upon registration. When the attribute information of document data includes multiple different types of attribute information such as the file name and created date of the document in addition to a keyword for document search, multiple different types of attribute information are brought into correspondence with one piece of document data upon registration. Thus, the string that a user intends by marking can be registered as the attribute information of the document data.

The document (or paper document) used for inputting document data may be not only an office document but also a magazine or a poster, for example.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus, comprising:
   a document input unit that inputs document data of a document;

a first identifying unit that identifies a position of a string in the document;

a second identifying unit that identifies a mark handwritten from a highlighter and is non-textual, the mark being separate from the string, in the document; and an orientation detection unit that detects an orientation of the mark, wherein the mark is defined by a range from a start position and an end position based on the detected orientation; and a character string extracting unit that extracts a new string, based on the position of the string identified by the first identifying unit, and the mark identified by the second identifying unit and defined based on the detected orientation.

2. The image processing apparatus according to claim 1, further comprising a registering unit that registers the string extracted by the character string extracting unit as attribute information of the document data.

3. The image processing apparatus according to claim 1, wherein the character string extracting unit extracts the string from a plurality of strings identified by the first identifying unit, based on the position of the string identified by the first identifying unit and the mark identified by the second identifying unit.

4. The image processing apparatus according to claim 1, wherein:

when at least one of the start position and the end position of the mark, which defines the mark is identified by the second identifying unit, is less than a beginning of the position of the string or an end of the position of the string, the character string extracting unit determines whether or not the string identified by the first identifying unit is to be extracted based on a extraction condition that is preset.

5. The image processing apparatus according to claim 4, wherein the extraction condition is based on a ratio between a part that the string from the plurality of strings overlaps the mark and a part that the given string does not overlap the mark.

6. The image processing apparatus according to claim 4, wherein the extraction condition is based on a type of word represented by the given string.

7. The image processing apparatus according to claim 1, wherein the second identifying unit having:

a connected pixel area extracting unit that extracts range of a connected pixel area in which pixels representing the mark given in the document are connected; and an end-of-mark identifying unit that identifies a beginning and an end of the mark based on the orientation of the mark identified by the orientation identifying unit and the range of the connected pixel area extracted by the connected pixel area extracting unit.

8. The image processing apparatus according to claim 7, wherein the end-of-mark identifying unit identifies, as the beginning and end of the mark, one end and the other end of the connected pixel area extracted by the connected pixel area extracting unit along the orientation of the mark identified by the orientation identifying unit.

9. The image processing apparatus of claim 1, wherein the character string extracting unit extracts the string based on the position of the string identified by the first identifying unit and whether the string overlaps the mark identified by the second identifying unit.

10. A non-transitory computer readable medium that records an image processing program that causes a computer to perform processing comprising:

inputting document data of a document;

identifying a position of a string in the document;

identifying a mark handwritten from a highlighter and is non-textual, the mark being separate from the string, given in the document;

detecting an orientation of the mark, wherein the mark is defined by a range from a start position and an end position based on the detected orientation, and extracting a new character string based on the position of the identified string and the identified mark, and the mark identified and defined based on the detected orientation.

11. The non-transitory computer readable medium of claim 10, further comprising:

extracting the string based on the identified position and whether the string overlaps the identified mark.

12. An image processing method to enable a computer to perform a process for document registration processing, the process comprising:

inputting document data of a document;

identifying a position of a string in the document;

identifying a mark handwritten from a highlighter and is non-textual, the mark being separate from the string, given in the document; and detecting an orientation of the mark, wherein the mark is defined by a range from a start position and an end position based on the detected orientation, and extracting a new character string based on the position of the identified string and the identified mark, and the mark identified and defined based on the detected orientation.

13. The image processing method of claim 12, further comprising:

extracting the string based on the identified position and whether the string overlaps the identified mark.

* * * * *